United States Patent Office 3,321,274
Patented May 23, 1967

3,321,274
PROCESS FOR REDUCING NITRIC OXIDE TO NITROUS OXIDE
Lynn H. Slaugh, Pleasant Hill, Calif., assignor to Shell Oil Company, New York, N.Y., a corporation of Delaware
No Drawing. Filed Dec. 13, 1963, Ser. No. 330,228
1 Claim. (Cl. 23—157)

ABSTRACT OF THE DISCLOSURE

Nitric oxide and sulfur dioxide are reduced to nitrous oxide and hydrogen sulfide, respectively, by reaction with hydrogen in the presence of a rhenium heptasulfide catalyst.

---

This invention relates to the reduction of normally gaseous inorganic oxides of certain non-metals and more particularly to the catalytic reduction of hydrogen of sulfur dioxide and nitric oxide.

Sulfur dioxide and nitric oxide are gaseous materials formed in certain chemical reactions and industrial processes. In some instances the presence of these materials is undesirable due to their noxious characteristics; they may appear together in atmosphere pollution. Often it may be advantageous and even necessary to remove the sulfur dioxide or nitric oxide from the vessel or area in which it is present. One possible means whereby this removal may be accomplished is by reduction of the sulfur dioxide or nitric oxide at the site of its formation.

Heretofore, the reduction of sulfur dioxide and nitric oxide has been generally accomplished only at relatively high temperatures. In the absence of a catalyst, sulfur dioxide is not hydrogen reduced readily at temperatures below 500° C. (Terres et al., Angewandte Chemie, 45, 164 (1932); Tomkinson, Comptes Rendes, 176, 35 (1923)). Nitric oxide is hydrogen reduced without the aid of a catalyst betwen 727° and 827° C. (Mellor, "A Comprehensive Treatise on Inorganic and Theoretical Chemistry," vol. 8, Longmans, Green and Co., New York, N.Y., 1928, pp. 428–429).

A few catalysts are known to be useful in aiding the reduction of sulfur dioxide. However these catalyzed reductions generally require temperatures above about 270° C. For example, nickel, cobalt and iron sulfides are not active in reducing sulfur dioxide below about 300° C. at atmospheric pressure (Neogi et al., Zeitschrift für anorganische Chemie, 69, 299 (1910)). The iron group metal oxide catalysts require temperatures in the range of from about 273° to 325° C. to reduce sulfur dioxide (Boswell, U.S. Patent No. 1,880,741 (1932)). Nitric oxide is known to be reduced in the presence of hydrogen and a metal catalyst at temperatures of from about 200° C. to more than 400° C. (Mellor, op. cit.).

It is an object of this invention to provide a process for the reduction of sulfur dioxide and nitric oxide at relatively moderate temperatures. It is also an object of this invention to provide a novel method of reducing nitric oxide whereby nitrous oxide is obtained as substantially the exclusive product.

It has now been discovered that the sulfur dioxide and nitric oxide may be reduced by hydrogen in the presence of rhenium sulfide as catalyst at room temperatures or above. More specifically, this reduction may be accomplished at temperatures above about 10° C. The preferred temperature range for the process is between about 20° C. and about 150° C. High temperatures may be used up to the point of catalyst instability, i.e., about 350°–400° C. However, such high temperatures fail to take advantage of relatively moderate temperature reduction afforded by this invention. It is also found that if the rhenium sulfide catalyzed reduction of nitric oxide is accomplished at temperatures above about 150° C. the substantially quantitative conversion to nitrous oxide is not obtained but instead nitrogen is recovered in major amounts.

The specific rhenium sulfide catalysts with which this invention is concerned are rhenium heptasulfide and rhenium disulfide. The preferred catalyst is rhenium heptasulfide. Rhenium heptasulfide catalyst may be prepared by any suitable method. A method most commonly used to pass hydrogen sulfide through a solution of a perrhenate salt such as ammonium or potassium perrhenate. The perrhenate salts are the form in which rhenium is recovered from flue gas in a molybdenite roaster. This method of recovering rhenium is well known. The perrhenate salts are available commercially.

Rhenium disulfide may be prepared by heating rhenium heptasulfide for a period of time at 350° to 450° C. under a continuous stream of carbon dioxide until the sulfur vapors are swept away leaving the rhenium disulfide residue. These methods of preparing the rhenium sulfide catalysts are described in detail by Broadbent et al., J. Am. Chem Soc. 76, 1519 (1954).

The sulfur dioxide or nitric oxide to be hydrogen reduced according to this process may be pure or technically pure or it may be in the form of gaseous mixtures with other gases or vapors which do not alter the reaction such as oxygen, nitrogen, carbon dioxide, etc. The particular source of the nitric oxide or sulfur dioxide to be reduced is not limited according to this invention.

The reduction reaction may be accomplished in any suitable equipment vessel. The reaction vessel may be equipped with single or multiple means for introducing the gas to be reduced and hydrogen as well as a suitable means for removing the products of the reaction. The nitric oxide or sulfur dioxide may be mixed with hydrogen outside of the vessel and the mixture then introduced into the reaction zone. Alternatively the gases may be separately introduced.

The rhenium sulfide catalyst may be used alone or it may be used with a relatively inert supporting or extending material such as asbestos, pumice, crushed rock, alumina, silica, diatomaceous earth and the like. The catalyst may be employed in the form of a fixed of fluidized bed.

The reaction zone may be such that the gaseous reaction mixture comprising the hydrogen and sulfur dioxide or nitric oxide are passed over the rhenium sulfide catalyst so that there is direct contact between the solid catalyst and the reacting gaseous phase. Alternatively the catalyst material may be suspended in a solvent for the gaseous materials whereby the nitric oxide or sulfur dioxide and hydrogen become dissolved therein and the reduction takes place at the liquid-solid interface. Suitable solvents which may be used comprise the relatively inert oragnic solvents such as alcohols and liquid hydrocarbons. Examples of these solvents comprise methanol, ethanol, n-propanol, isopropanol, butanol, hexanol, octanol, hexane, octane, dodecane and the like which are liquid at the reaction temperatures. The saturated solvents are preferred over unsaturated solvents such as olefins and aromatic compounds since the unsaturated solvents may become hydrogenated which may affect the rate of the reduction reaction. Solvents such as the aldehydes and ketones may also become hydrgenated if used in the process of this invention. However, the fact that the saturated hydrocarbons and alcohols are preferred does not exclude the use of other solvents even though they may become hydrogenated to some extent during the process.

Pressures within the reaction zone do not appear to be critical and may be subatmospheric, atmospheric or superatmospheric.

The reduction reactions described herein are exothermic and thus no heating will generally be necessary to sustain the reaction once it has started. However, should the temperature within the reaction zone be below room temperature (about 20° C.) heat may be applied to bring the reactants to the initial reaction temperature.

The relative proportions of hydrogen to nitric oxide or sulfur dioxide are not critical. However an amount of hydrogen in excess of that amount which is stoichiometrically necessary to reduce all of the nitric oxide or sulfur dioxide present is preferred. Usually, principally for economic reasons, no more than ten times the stoichiometric amount will be used.

The following examples are presented to further illustrate the process of this invention:

PREPARATION OF THE CATALYST

Rhenium heptasulfied ($Re_2S_7$) was prepared by bubbling hydrogen sulfide through a 5-6 N hydrochloric acid solution of 3% ammonium perrhenate which was maintained at the boiling point. The resulting rhenium heptasulfide was filtered, washed and dried.

*Example I*

0.4 g. of rhenium heptasulfide prepared as indicated above was placed in a reaction vessel which contained 20 ml. of isopropyl alcohol. The vessel was equipped with a magnetic stirrer. Sulfur dioxide (8 mmoles) was injected into the reaction vessel which was then heated to about 100° C. A stoichiometric excess of hydrogen was introduced under pressure and stirring was initiated. The reduction reaction was allowed to continue for about 5 minutes after which time hydrogen sulfide and sulfur were removed as products. Substantially all of the sulfur dioxide was reduced.

*Example II*

Rhenium heptasulfide (0.5 g.) was placed in an autoclave containing 20 ml. of n-dodecane and the sulfur dioxide (109 mmoles) to be reduced was injected. The temperature of the vessel was raised to about 100° C. while hydrogen was introduced. Stirring was initiated and the reaction was allowed to proceed for about 3 hours after which time hydrogen sulfide and sulfur were recovered. The reduction of sulfur dioxide was complete.

*Example III*

Rhenium heptasulfide (0.4 g.) was placed in a reaction vessel containing 20 ml. of isopropyl alcohol. 43 mmoles of nitric oxide were introduced and the temperature of the vessel maintained at about 120° C. while hydrogen was introduced under pressure. Stirring of the isopropyl alcohol solutoin was continued while the reaction took place. After about one minute the reaction was completed. The gaseous product was analyzed and it was found that 96% of the nitric oxide was converted to nitrous oxide.

*Example IV*

0.5 g. of rhenium heptasulfide and 20 ml. of n-dodecane were sealed in a magnetically stirred autoclave. About 100 mmoles of nitric oxide was injected and the autoclave heated to about 100° C. while hydrogen was introduced under pressure. Stirring was initiated and continued throughout the reaction. After about 2 minutes the reaction was completed. Nitrous oxide was the exclusive product.

*Example V*

0.4 g. of rhenium heptasulfide was placed in a sealed reaction vessel having a capacity of 80 ml. and containing 20 ml. of dodecane. Nitric oxide (200 p.s.i.g.) and hydrogen (300 p.s.i.g.) were introduced. The reaction was carried out at about 20° C. for a period of 50 minutes. The major product recovered was nitrous oxide.

*Example VI*

Rhenium heptasulfide (0.4 g.) is placed in a magnetically stirred autoclave containing 20 ml. of isopropyl alcohol. 8 mmoles of sulfur dioxide, 43 mmoles of nitric oxide and a stoichiometric excess of hydrogen are introduced. The temperature within the autoclave is maintained at about 100° C. and stirring is initiated. After the reaction is completed (about 5 minutes) essentially all of the nitric oxide is reduced to nitrous oxide and similarly sulfur dioxide is reduced to sulfur and hydrogen sulfide.

The following example illustrates the effect higher temperatures have on the products formed by the nitric oxide reduction.

*Example VII*

A mixture of nitric oxide (200 p.s.i.g.) and hydrogen (200 p.s.i.g.) were sealed in an 80 ml. magnetically stirred autoclave containing 20 ml. of dodecane and 0.4 g. of rhenium heptasulfide. The reaction temperature was about 195° C. After 1 hour the reaction was completed. The product contained over 90% nitrogen.

The reactions described above may also be carried out by supplying the catalyst as rhenium disulfide.

I claim as my invention:

The process for reducing nitric oxide to nitrous oxide which comprises reacting nitric oxide with hydrogen in the presence of rhenium heptasulfide at a temperature of from about 20° C. to about 150° C.

References Cited by the Examiner

Cotton et al., Advanced Inorganic Chemistry, 1962, page 804.

OSCAR R. VERTIZ, *Primary Examiner.*

B. H. LEVENSON, *Assistant Examiner.*